United States Patent

Okuhira et al.

(10) Patent No.: US 9,963,104 B2
(45) Date of Patent: May 8, 2018

(54) ANCHOR FOR SEATBELT DEVICE

(71) Applicant: KABUSHIKI KAISHA TOKAI-RIKA-DENKI-SEISAKUSHO, Aichi-ken (JP)

(72) Inventors: Tomohiro Okuhira, Aichi-ken (JP); Tomotaka Suzuki, Aichi-ken (JP); Takahiro Hamada, Aichi-ken (JP); Tetsushi Urushibata, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 191 days.

(21) Appl. No.: 15/003,201

(22) Filed: Jan. 21, 2016

(65) Prior Publication Data

US 2016/0214566 A1    Jul. 28, 2016

(30) Foreign Application Priority Data

Jan. 23, 2015    (JP) .................................. 2015-11760

(51) Int. Cl.
*B60R 22/18* (2006.01)
*B60R 22/24* (2006.01)

(52) U.S. Cl.
CPC .............. *B60R 22/18* (2013.01); *B60R 22/24* (2013.01); *B60R 2022/1818* (2013.01); *B60R 2022/1843* (2013.01)

(58) Field of Classification Search
CPC . B60R 22/18; B60R 22/24; B60R 2022/1843; B60R 2022/1818
See application file for complete search history.

(56) References Cited

U.S. PATENT DOCUMENTS

| 6,491,347 | B2 * | 12/2002 | Iseki | A47C 31/04 280/801.1 |
| 7,578,525 | B2 * | 8/2009 | You | B60R 22/24 280/801.1 |
| 9,150,191 | B2 * | 10/2015 | Toyama | B60R 22/24 |
| 2004/0227341 | A1 * | 11/2004 | Hattori | B60R 22/24 280/801.1 |
| 2014/0306436 | A1 * | 10/2014 | Toyama | B60R 22/24 280/801.1 |

FOREIGN PATENT DOCUMENTS

| JP | 2001-310702 | | 11/2001 | |
| JP | 2006-036186 | A | 2/2006 | |
| JP | 2014-205422 | A | 10/2014 | |
| WO | WO-2015186505 | A1 * | 12/2015 | ............. B60R 22/24 |

OTHER PUBLICATIONS

Office Action issued in the corresponding Japanese Application No. 2015-011760 dated Oct. 3, 2017.

* cited by examiner

*Primary Examiner* — Karen Beck
(74) *Attorney, Agent, or Firm* — Roberts Mlotkowski Safran Cole & Calderon P.C.

(57) ABSTRACT

In a through anchor, it enables a piece to be moved to an attachment position of the piece in a metal core by moving the piece toward a vehicle front lower side in a state in which a lower end portion of a guide portion of a guide groove of the piece is abutted with a guide projection formed at a metal core lower portion of the metal core.

7 Claims, 6 Drawing Sheets

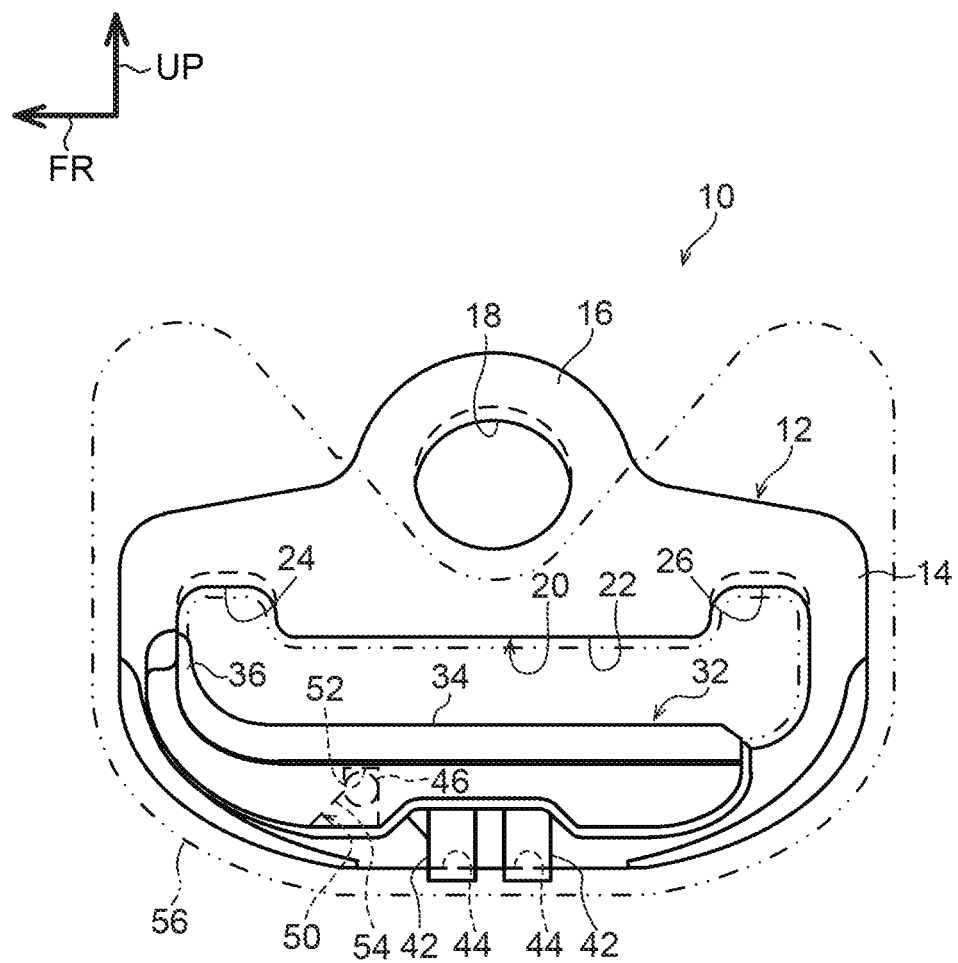

ANCHOR FOR SEATBELT DEVICE

CROSS-REFERENCE TO RELATED APPLICATION

This application claims priority under 35 USC 119 from Japanese Patent Application No. 2015-011760 filed Jan. 23, 2015, the disclosure of which is incorporated by reference herein.

BACKGROUND

Field of the Invention

The present invention relates to an anchor for a seatbelt device in which a piece is attached to a metal core.

Related Art

Configurations exist in which apiece is prevented from displacing or detaching with respect to a metal core by fitting a recess or a protrusion formed at the piece with a protrusion or a recess formed at the metal core (see, for example, Japanese Patent Application Laid-Open (JP-A) No. 2001-310702).

In such configurations, during attachment of the piece to the metal core, the piece has to be moved appropriately with respect to the metal core as far as a position where the recess or the protrusion formed at the piece fits with the protrusion or the recess formed at the metal core, namely as far as an attachment position of the piece to the metal core.

SUMMARY

In consideration of the above circumstances, the present invention obtains an anchor for a seatbelt device that enables a piece to be easily moved to an attachment position of the piece at a metal core.

An anchor for a seatbelt device of a first aspect includes: a metal core at which a through hole is formed, a webbing for restraining an occupant being inserted through and supported at the through hole; a piece member that is provided inside the through hole so as to be attached to the metal core; and a guide mechanism that guides the piece member disposed inside the through hole to an attachment position of the piece member in the metal core.

According to the anchor for a seatbelt device of the first aspect, the piece member disposed inside the through hole of the metal core is guided to the attachment position of the piece member in the metal core by the guide mechanism. The piece member is thereby attached to the metal core at the attachment position.

The anchor for a seatbelt device of a second aspect is the anchor for a seatbelt device of the first aspect, wherein the guide mechanism includes: a guide projection that is formed at one of the metal core or the piece member; and a guide groove that is formed at another of the metal core or the piece member, the piece member being guided to the attachment position by the piece member being moved with respect to the metal core in a state in which the guide groove abuts the guide projection.

The anchor for a seatbelt device of the second aspect enables the piece member to be guided to the attachment position of the piece member in the metal core by the piece member being moved with respect to the metal core in a state in which the guide groove is abutted with the guide projection.

In the second aspect, it is possible that the through hole includes an elongated hole portion with a longitudinal direction thereof being in a vehicle front-rear direction, and a through hole turn-up portion that extends from one end portion in the vehicle front-rear direction of the elongated hole portion toward a vehicle upper side; the guide groove is opened at one side in a vehicle upper-lower direction, and includes a positioning portion to which the guide projection is guided to be positioned, and a guide portion by which the guide projection is guided; the positioning portion is configured at another side of the guide groove in the vehicle upper-lower direction; the guide portion is configured at a side of the guide groove, in the vehicle front-rear direction, where the through hole turn-up portion is formed at the elongated hole portion of the through hole; and the guide portion has an inclined face extending toward the one side in the vehicle upper-lower direction, and the side, in the vehicle front-rear direction, where the through hole turn-up portion is formed at the elongated hole portion of the through hole.

The anchor for a seatbelt device of a third aspect is the anchor for a seatbelt device of either the first aspect or the second aspect, wherein a guiding direction of the piece member by the guide mechanism is a single direction.

The anchor for a seatbelt device of the third aspect facilitates attachment of the piece member to the metal core since the guiding direction of the piece member by the guide mechanism is a single direction (one direction).

The anchor for a seatbelt device of a fourth aspect is the anchor for a seatbelt device of the third aspect, wherein: the through hole includes an elongated hole portion with a longitudinal direction thereof being in a vehicle front-rear direction, and a through hole turn-up portion that extends from one end portion in the vehicle front-rear direction of the elongated hole portion toward a vehicle upper side; the piece member includes a piece member turn-up portion that is disposed inside the through hole turn-up portion of the through hole, a vehicle upper side end portion of the piece member turn-up portion projecting out further toward a vehicle upper side than a vehicle upper side end portion of the elongated hole portion in a state in which the piece member is attached to the metal core; and the guiding direction of the piece member by the guide mechanism is a direction which is inclined toward a vehicle lower side, with respect to a side, in the vehicle front-rear direction, where the through hole turn-up portion is formed at the elongated hole portion of the through hole.

According to the anchor for a seatbelt device of the fourth aspect, the vehicle upper side end portion of the piece member turn-up portion that is disposed inside the through hole turn-up portion of the through hole of the metal core projects out further toward the vehicle upper side than the vehicle upper side end portion of the elongated hole portion of the through hole in an attached state of the piece member to the metal core. Even in such a configuration, the guiding direction of the piece member by the guide mechanism is a direction inclined toward the vehicle lower side, with respect to the side, in the vehicle front-rear direction, where the through hole turn-up portion is formed at the elongated hole portion of the through hole. Accordingly, even in such a configuration, the guiding direction of the piece member by the guide mechanism is a single direction, thereby facilitating attachment of the piece member to the metal core.

In the fourth aspect, it is possible that the guide groove is opened at the vehicle lower side, and includes a positioning portion to which the guide projection is guided to be positioned, and a guide portion by which the guide projection is guided; the positioning portion is configured at the vehicle upper side of the guide groove; the guide portion is configured at the side of the guide groove, in the vehicle front-rear direction, where the through hole turn-up portion is formed at the elongated hole portion of the through hole; and the guide portion has an inclined face extending toward the vehicle lower side in vehicle upper-lower direction, and the side, in the vehicle front-rear direction, where the through hole turn-up portion is formed at the elongated hole portion of the through hole.

As described above, the anchor for a seatbelt device according to the present invention enables the piece member to be easily moved to the attachment position of the piece member to the metal core.

BRIEF DESCRIPTION OF THE DRAWINGS

Embodiments of the invention will be described in detail with reference to the following figures, wherein:

FIGS. 4A and 4B are side views corresponding to FIG. 1 with a section cut away along line 4-4 in FIG. 2, to explain attachment of a piece to a metal core, wherein FIG. 4A illustrates a piece prior to being moved to an attachment position of the piece to the metal core, and FIG. 4B illustrates the piece after being moved to the attachment position of the piece to the metal core;

FIG. 5 is a face-on view of a vehicle right side seat-use anchor for a seatbelt device according to an exemplary embodiment, as viewed from the vehicle width direction inside.

DETAILED DESCRIPTION

Figure 1:
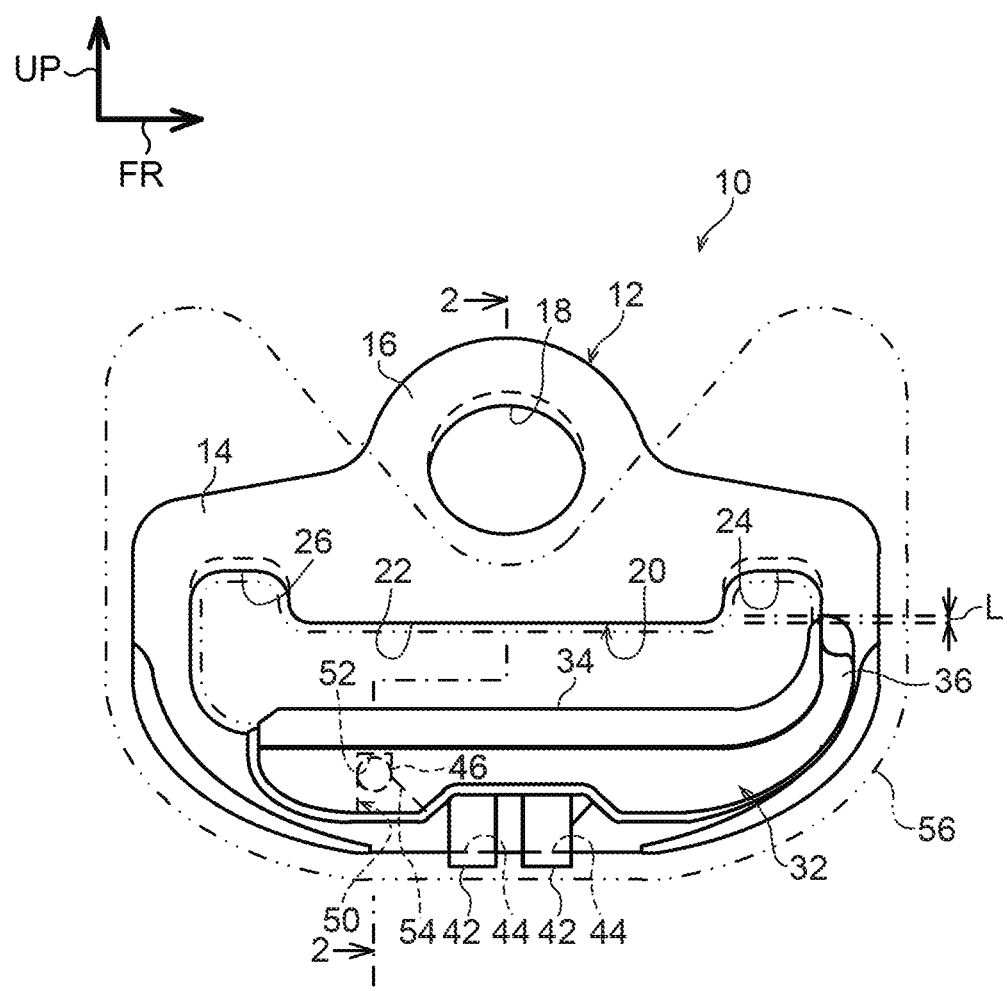
FIG. 1 is a face-on view of a vehicle left side seat-use anchor for a seatbelt device according to an exemplary embodiment, as viewed from the vehicle width direction inside.

Explanation follows regarding an exemplary embodiment, with reference to FIG. 1 to FIG. 6. In the drawings, the arrow FR indicates the vehicle front side, the arrow LH indicates the vehicle left side, and the arrow UP indicates the vehicle upper side.

Configuration of Present Exemplary Embodiment

Figure 2:
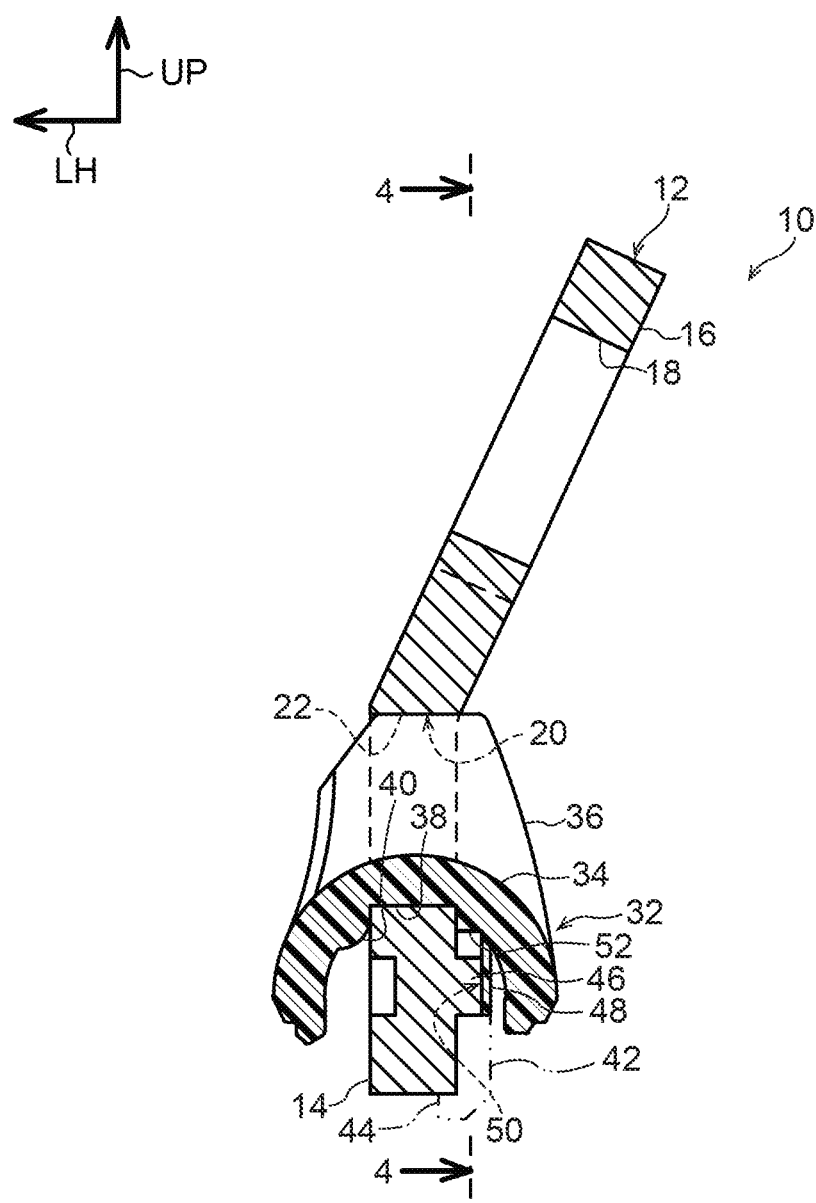
FIG. 2 is a cross-section taken along line 2-2 in FIG. 1.

As illustrated in FIG. 1 and FIG. 2, a through anchor 10 for a left side vehicle seat, serving as an anchor for a seatbelt device according to the present exemplary embodiment, includes a metal core 12. The metal core 12 is formed by press-forming a metal plate member, such as a steel plate member. The metal core 12 includes a metal core lower portion 14. A longitudinal direction of the metal core lower portion 14 is along a vehicle front-rear direction, and a thickness direction of the metal core lower portion 14 is along a vehicle left-right direction (vehicle width direction). A metal core upper portion 16 is formed at a vehicle front-rear direction intermediate portion of an upper end portion of the metal core lower portion 14. A vehicle front-rear direction dimension of the metal core upper portion 16 is shorter than the vehicle front-rear direction dimension of the metal core lower portion 14, and the metal core upper portion 16 extends out from the vehicle front-rear direction intermediate portion of the metal core lower portion 14. In the metal core 12, a part that is further toward the vehicle upper side than a vehicle up-down direction intermediate portion of the metal core lower portion 14 is inclined toward the vehicle width direction inside (this being the vehicle right side in the through anchor for the left side vehicle seat) with respect to a part that is further toward the vehicle lower side than the vehicle up-down direction intermediate portion of the metal core lower portion 14.

A support hole 18 is formed in the metal core upper portion 16 of the metal core 12. The support hole 18 has a substantially circular shaped cross-section, and the support hole 18 penetrates it in the thickness direction of the metal core upper portion 16. A support bolt (not illustrated in the drawings), serving as a support member, penetrates the support hole 18 from the vehicle width direction inside. The support bolt is attached by a nut to, for example, a slider of an anchor height adjustment device provided at a center pillar (none of which are illustrated in the drawings) on the vehicle width direction outside of the through anchor 10. The through anchor 10 is thus supported on the vehicle body so as to be capable of rotating (swinging) about the support bolt.

In the metal core lower portion 14 of the metal core 12, a through hole 20 is formed. The through hole 20 penetrates the metal core lower portion 14 of the metal core 12 in the vehicle left-right direction, and a webbing 100 of the seatbelt device passes through the through hole 20. The through hole 20 includes an elongated hole portion 22. The longitudinal direction of the elongated hole portion 22 is along the vehicle front-rear direction. A front side turn-up portion 24, serving as a through hole turn-up portion, is formed at a vehicle front side end portion of the elongated hole portion 22. The front side turn-up portion 24 extends from the vehicle front side end portion of the elongated hole portion 22 toward the vehicle upper side. A rear side turn-up portion 26 is formed at a vehicle rear side end portion of the elongated hole portion 22. The rear side turn-up portion 26 extends from the vehicle rear side end portion of the elongated hole portion 22 toward the vehicle upper side.

A piece (piece member) 32 is provided at the metal core lower portion 14 of the metal core 12. The piece 32 is formed from a synthetic resin material. The piece 32 includes a piece body 34. The longitudinal direction of the piece body 34 is along the vehicle front-rear direction, and apiece turn-up portion 36 is formed at a vehicle front side end portion of the piece body 34. The piece turn-up portion 36 extends from the vehicle front side end portion of the piece body 34 toward the vehicle upper side.

As illustrated in FIG. 2, a vehicle upper side face of the piece body 34 of the piece 32 configures a curved face that protrudes out toward the vehicle upper side. Although omitted from illustration in the drawings, a vehicle rear side face of the piece turn-up portion 36 of the piece 32 configures a curved face that protrudes out toward the vehicle rear side, and the vehicle rear side face of the piece turn-up portion 36 is contiguous to the vehicle upper side face of the piece body 34. The vehicle upper side face of the piece turn-up portion 36 of the piece 32 and the vehicle rear side face of the piece turn-up portion 36 of the piece 32 are abutted by the webbing 100 that passes through the through hole 20.

A vehicle lower side face of the piece 32 configures a curved face opening toward the vehicle lower side, and a vehicle front side face of the piece 32 configures a curved face opening toward the vehicle front side. A groove portion 38 is formed at vehicle width direction intermediate portions of the vehicle lower side face and the vehicle front side face of the piece 32. The groove portion 38 is formed with a substantially rectangular shaped cross-section, and the groove portion 38 is moreover open toward the vehicle lower side at the vehicle lower side face of the piece 32, and open toward the vehicle front side at the vehicle front side face of the piece 32. A guide face 40 is formed at the vehicle width direction outside (on the vehicle left side in a through anchor 10 for the left side vehicle seat) of an open end of the groove portion 38.

The guide face 40 is configured by a curved face protruding out toward the vehicle width direction inside and the vehicle lower side. When the piece 32 slides toward the vehicle lower side with respect to the metal core 12 in a state in which a vehicle lower side end portion of the through hole 20 of the metal core 12 is abutted with the guide face 40, the piece 32 is moved toward the vehicle width direction inside (the vehicle right side in a through anchor 10 for the left side vehicle seat) until the vehicle lower side end portion of the through hole 20 of the metal core 12 enters the groove portion 38 of the piece 32.

The vehicle lower side end portion and the vehicle front side end portion of the through hole 20 of the metal core 12 enter the groove portion 38 of the piece 32. The piece 32 is attached to the metal core 12 in this state.

As illustrated in FIG. 1 and FIG. 2, retention tabs 42 are formed at the piece body 34 of the piece 32. The retention tabs 42 extend out toward the vehicle lower side from a vehicle front-rear direction intermediate portion of a vehicle lower side face of the piece body 34. A vehicle lower side end portion of each retention tab 42 is formed with a retention claw 44. The retention claws 44 are formed projecting out from the vehicle lower side end portions of the retention tabs 42 toward the vehicle width direction outside (the vehicle left side in the through anchor 10 for the left side vehicle seat). In an attached state of the piece 32 to the metal core 12, a vehicle width direction outside face of each retention tab 42 (a vehicle left side face of each retention tab 42 in the through anchor 10 for the left side vehicle seat) is abutted with a vehicle width direction inside face of the metal core lower portion 14 of the metal core 12 (a vehicle right side face of the metal core lower portion 14 in the through anchor 10 for the left side vehicle seat), and a vehicle upper side face of each retention claw 44 is abutted with a vehicle lower side face of the metal core lower portion 14 of the metal core 12.

As illustrated in FIG. 1, in an attached state of the piece 32 to the metal core 12, a vehicle upper side end portion (an upper end in the vehicle up-down direction) of the piece turn-up portion 36 of the piece 32 projects out further to the vehicle upper side than a vehicle upper side portion of the elongated hole portion 22 of the through hole 20 of the metal core 12 by a dimension L.

As illustrated in FIG. 1 and FIG. 2, a guide projection 46, configuring a guide mechanism, is provided at the metal core lower portion 14 of the metal core 12. The guide projection 46 projects out toward the vehicle width direction inside (the vehicle right side in the through anchor 10 for the left side vehicle seat) from a portion of the metal core lower portion 14 that is further to the vehicle lower side than the through hole 20. The guide projection 46 is formed offset toward one side (the vehicle rear side in the through anchor 10 for the left side vehicle seat) with respect to the vehicle front-rear direction center of the metal core 12.

As illustrated in FIG. 2, a guide tab 48 configuring the guide mechanism is provided at the piece 32. The guide tab 48 extends from the vehicle lower side face of the piece body 34 of the piece 32 toward the vehicle lower side, and the guide tab 48 is formed offset further toward the one side (the vehicle rear side in the through anchor 10 for the left side vehicle seat) than the retention tabs 42 of the piece 32 (than the vehicle front-rear direction center of the piece 32).

The guide tab 48 is formed with a guide groove 50. The guide groove 50 opens at a vehicle width direction outside face of the guide tab 48 (a vehicle left side face of the guide tab 48 in the through anchor 10 for the left side vehicle seat) and, as illustrated in FIG. 1, the guide groove 50 is open at a vehicle lower side end portion of the guide tab 48.

The guide groove 50 includes a positioning portion 52. The positioning portion 52 is formed at a portion further to the vehicle rear side than a vehicle front-rear direction intermediate portion of the guide groove 50 and further to the vehicle upper side than a vehicle up-down direction intermediate portion of the guide groove 50. In an attached state of the piece 32 to the metal core 12, the guide projection 46 of the metal core 12 enters the positioning portion 52 of the guide groove 50, and an outer peripheral face of the guide projection 46 abuts a vehicle front side face and a vehicle rear side face of the positioning portion 52, thereby restricting relative movement of the piece 32 with respect to the metal core 12 in the vehicle front-rear direction.

The guide groove 50 further includes a guide portion 54. The guide portion 54 is formed at the vehicle front side of the positioning portion 52, and at the vehicle lower side of the positioning portion 52. The guide portion 54 is configured by an inclined face that displaces toward the vehicle lower side on progression toward the vehicle front side.

In a state in which the guide projection 46 of the metal core 12 abuts a vehicle front-lower side end portion of the guide portion 54, the piece 32 is disposed further to the vehicle upper side of the metal core 12 than in an attached state of the piece 32 to the metal core 12. Moreover, in this state, the piece turn-up portion 36 enters inside the front side turn-up portion 24 of the through hole 20. A form-position and an angle of inclination of the guide portion 54 of the guide groove 50 and the like are set such that the piece turn-up portion 36 of the piece 32 does not abut a vehicle rear side face of the front side turn-up portion 24 of the through hole 20 of the metal core 12, even when moving the piece 32 toward the vehicle front-lower side in a state in which the guide projection 46 of the metal core 12 is abutted with the guide portion 54 of the guide groove 50.

The through anchor 10 further includes a mold portion 56. The mold portion 56 is formed by setting the metal core 12 in a mold used for mold-forming in a state in which the piece 32 is attached to the metal core 12, and filling the mold with a synthetic resin material for use in mold-forming in this state. Accordingly, a portion at the metal core lower portion 14 of the metal core 12, excluding a portion where the piece 32 is attached at the inside face of the through hole 20, is covered by the mold portion 56. Moreover, the mold portion 56 is formed from a different synthetic resin material to the piece 32, with the piece 32 being configured from a synthetic resin material having a lower sliding resistance against the webbing 100 than the synthetic resin material configuring the mold portion 56.

FIG. 5 illustrates a through anchor 10 for the right side vehicle seat. As illustrated in this figure, the metal core 12 of the through anchor 10 for the right side vehicle seat is used such that the metal core 12 of the through anchor 10 for the left side vehicle seat reverses (rotates 180 degree) around an axis whose axial direction is the vehicle up-down direction. Accordingly, the guide projection 46 of the metal core 12 of the through anchor 10 for the right side vehicle seat is formed offset further toward the vehicle front than the vehicle front-rear direction center of the metal core 12, and moreover, the guide projection 46 projects out from a vehicle left side face of the metal core lower portion 14 toward the vehicle left side.

Conversely, the piece 32 of the through anchor 10 for the left side vehicle seat is not used for the through anchor 10 for the right side vehicle seat. A piece 32 of the through anchor 10 for the right side vehicle seat is configured differently to the piece 32 of the through anchor 10 for the left side vehicle seat, and more specifically, in the piece 32 of the through anchor 10 for the right side vehicle seat, the guide tab 48 is formed offset further toward the vehicle front side than the retention tabs 42 of the piece 32 (than the vehicle front-rear direction center of the piece 32).

Operation and Advantageous Effects of the Present Exemplary Embodiment

Next, explanation follows regarding a procedure for attaching the piece 32 to the metal core 12 by way of explanation of the operation and advantageous effects of the present exemplary embodiment.

Figure 3:
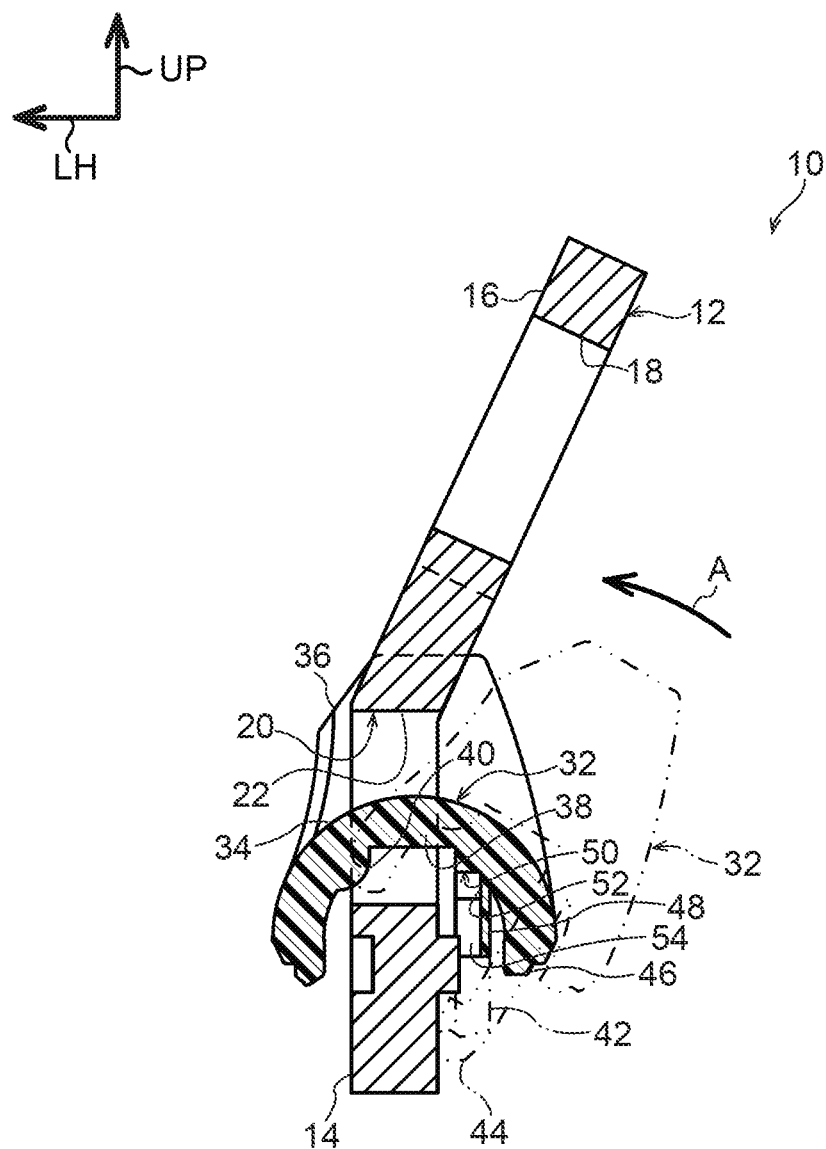
FIG. 3 is a cross-section corresponding to FIG. 2 to explain attachment of a piece to a metal core.

When attaching the piece 32 to the metal core 12, the piece 32 is disposed with respect to the metal core 12 such that the piece turn-up portion 36 of the piece 32 is positioned at the vehicle width direction inside of the front side turn-up portion 24 of the through hole 20 of the metal core 12 (at the vehicle right side of the front side turn-up portion 24 in the through anchor 10 for the left side vehicle seat). In this state, as illustrated in FIG. 3, vehicle width direction outside end portions of the retention claws 44 of the retention tabs 42 of the piece 32 (vehicle left side end portions of the retention claws 44 in the through anchor 10 for the left side vehicle seat) abut the vehicle width direction inside face of the metal core lower portion 14 of the metal core 12 (the vehicle right side face of the metal core lower portion 14 in the through anchor 10 for the left side vehicle) at a portion further to the vehicle lower side than the guide projection 46.

Figure 4A:
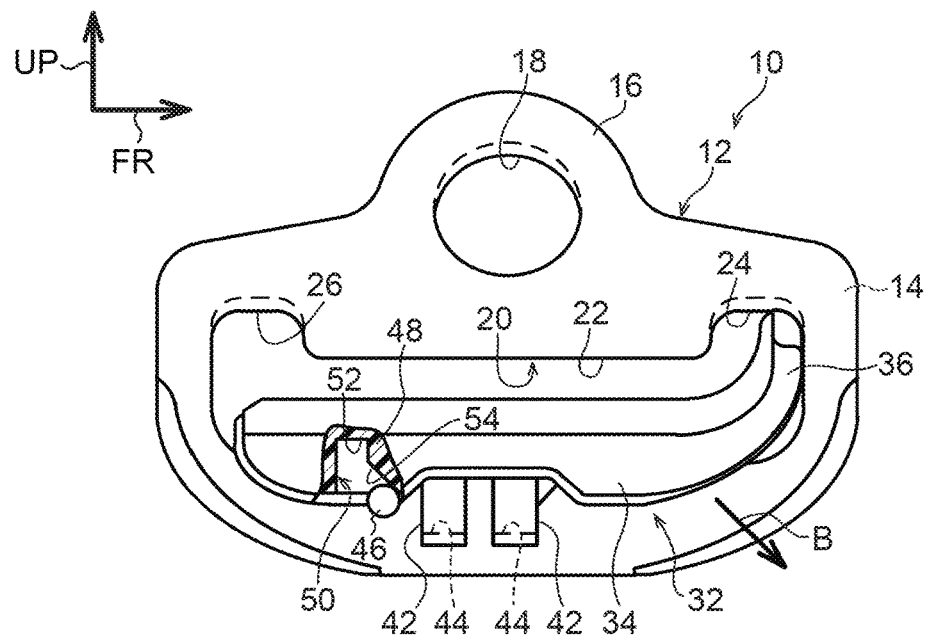

In this state, the piece 32 is rotated toward the vehicle width direction outside (the arrow A direction in FIG. 3) with respect to the metal core 12 until the piece turn-up portion 36 of the piece 32 is disposed inside the front side turn-up portion 24 of the through hole 20. Accordingly, as illustrated in FIG. 4A, the guide projection 46 of the metal core lower portion 14 of the metal core 12 abuts the vehicle front side and lower side end portion of the guide portion 54 in the guide groove 50 of the guide tab 48 of the piece 32. Next, the piece 32 is slid toward the vehicle front side and lower side with respect to the metal core 12 with maintaining a state of abutting between the guide projection 46 and the guide portion 54 of the guide groove 50.

Due to sliding the piece 32 toward the vehicle front-lower side with respect to the metal core 12, the guide face 40 of the piece 32 abuts the vehicle lower side end portion of the elongated hole portion 22 of the through hole 20 of the metal core 12. When the piece 32 is slid further toward the vehicle front-lower side in this state, the piece 32 is moved toward the vehicle width direction outside (the vehicle left side in the through anchor 10 for the left side vehicle seat) with respect to the metal core 12. Vehicle upper side portions of the retention tabs 42 are thereby resiliently deformed toward the vehicle width direction inside (the vehicle right side in the through anchor 10 for the left side vehicle seat) with respect to vehicle lower side portions of the retention tabs 42 of the piece 32.

Figure 4B:
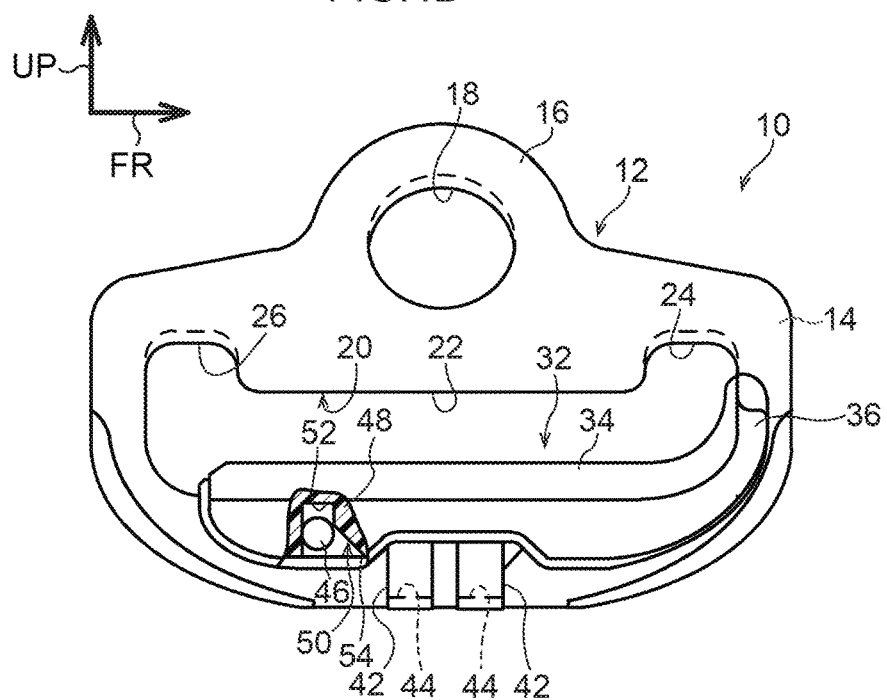
Figure 6:
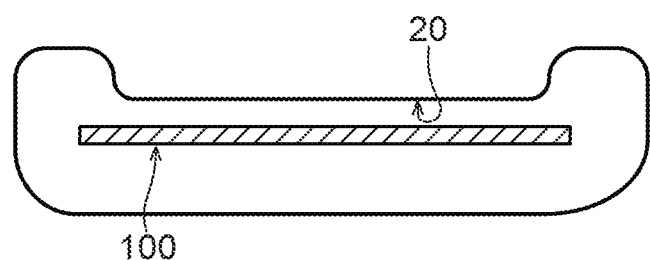
FIG. 6 is a simplified cross-sectional view showing a webbing being inserted through a through hole of the metal core.

When the piece 32 is slid toward the vehicle front-lower side until a vehicle rear end portion of the guide groove 50 of the guide tab 48 of the piece 32 abuts the guide projection 46 of the metal core 12, a portion of the guide projection 46 of the metal core 12 enters the positioning portion 52 of the guide groove 50, as illustrated in FIG. 4B. In this state, the vehicle lower side end portion and vehicle front side end portion of the through hole 20 of the metal core 12 enter the groove portion 38 of the piece 32. Moreover, in this state, the retention tabs 42 of the piece 32 resiliently recover to be originally state, and vehicle upper side faces of the retention claws 44 of the retention tabs 42 abut the vehicle lower side face of the metal core lower portion 14 of the metal core 12.

Accordingly, in the present exemplary embodiment, the piece 32 is attached to the metal core 12 by sliding the piece 32 toward the vehicle front-lower side in a state in which the piece turn-up portion 36 of the piece 32 is entered inside the front side turn-up portion 24 of the through hole 20 of the metal core 12. This thereby enables the piece 32 to be attached to the metal core 12 even in configuration in which the vehicle upper side end portion of the piece turn-up portion 36 projects out further to the vehicle upper side than the vehicle upper side portion of the elongated hole portion 22 of the through hole 20 in an attached state of the piece 32 to the metal core 12.

Moreover, the piece 32 can be attached to the metal core 12 simply by placing the guide portion 54 of the guide groove 50 formed at the guide tab 48 of the piece 32 abutting with the guide projection 46 of the metal core 12, and sliding the piece 32 toward the vehicle front-lower side in this state. This thereby enables easy attaching of the piece 32 at the attachment position of the piece 32 in the metal core 12.

In a state in which the piece turn-up portion 36 of the piece 32 is inside the front side turn-up portion 24 of the through hole 20 of the metal core 12, the slide direction of the piece 32 in order to attach the piece 32 to the metal core 12 is one direction (single direction) in a straight line toward the vehicle front-lower side. This thereby enables attachment of the piece 32 to the piece 32 attachment position in the metal core 12 to be automated easily.

The position where the guide projection 46 is formed at the metal core 12 is offset further to the one side in the vehicle front-rear direction (the vehicle rear side in the through anchor 10 for the left side vehicle seat) than the vehicle front-rear direction center of the metal core 12. The position where the guide tab 48 is formed at the piece 32 also corresponds thereto. The positions where the guide tabs 48 are formed therefore differs between a through anchor 10 for the left side vehicle seat and a through anchor 10 for the right side vehicle seat. This thereby enables incorrect attachment of the piece 32 to be prevented or effectively suppressed.

Moreover, costs are kept low since the through anchor 10 for the left side vehicle seat and the through anchor 10 for the right side vehicle seat can share (use) a common metal core 12.

In the present exemplary embodiment, configuration is made in which the guide projection 46 is formed at the metal core 12, and the guide groove 50 is formed at the piece 32. However, configuration may be made in which a guide groove is formed at the metal core 12, and a guide projection is formed at the piece 32 so as to correspond to the guide groove.

Moreover, in the present exemplary embodiment, configuration is made in which the vehicle upper side end portion of the piece turn-up portion 36 projects out further to the vehicle upper side than the vehicle upper side portion of the elongated hole portion 22 of the through hole 20 in the attached state of the piece 32 to the metal core 12. However, configuration may be made in which the vehicle upper side end portion of the piece turn-up portion 36 is positioned further to the vehicle lower side than the vehicle upper side portion of the elongated hole portion 22 of the through hole 20 in the attached state of the piece 32 to the metal core 12, further, configuration may also be made in which the piece 32 is not formed with the piece turn-up portion 36.

What is claimed is:

1. An anchor for a vehicular seatbelt device, comprising:
a metal core at which a through hole is formed, a webbing for restraining a vehicular occupant being inserted through and supported at the through hole;
a piece member that is provided inside the through hole so as to be attached to the metal core; and
a guide mechanism that is configured to guide the piece member disposed inside the through hole along a single direction to an attachment position of the piece member in the metal core,
wherein the single guiding direction to the piece member by the guide mechanism is along a line inclined toward a vehicle lower side with respect to both a vehicle front-rear direction and a vertical direction.

2. An anchor for a seatbelt device, comprising:
a metal core at which a through hole is formed, a webbing for restraining an occupant being inserted through and supported at the through hole;
a piece member that is provided inside the through hole so as to be attached to the metal core; and
a guide mechanism that guides the piece member disposed inside the through hole to an attachment position of the piece member in the metal core, wherein the guide mechanism includes:
a guide projection that is formed at one of the metal core or the piece member; and
a guide groove that is formed at another of the metal core or the piece member, the piece member being guided to the attachment position by the piece member being moved with respect to the metal core in a state in which the guide groove abuts the guide projection,
the guide groove including a positioning portion to which the guide projection is guided to be positioned and a guide portion by which the guide projection is guided, and
at the guide groove,
the guide portion is disposed at a first side toward which the piece member is guided in a guiding direction of the piece member by the guide mechanism, and
the positioning portion is disposed at a second side opposite to the first side in the guiding direction.

3. The anchor for a seatbelt device of claim 2, wherein a guiding direction of the piece member by the guide mechanism is a single direction.

4. The anchor for a seatbelt device of claim 1, wherein:
the through hole includes an elongated hole portion with a longitudinal direction thereof being in a vehicle front-rear direction, and a through hole turn-up portion that extends from one end portion in the vehicle front-rear direction of the elongated hole portion toward a vehicle upper side;
the piece member includes a piece member turn-up portion that is disposed inside the through hole turn-up portion of the through hole, a vehicle upper side end portion of the piece member turn-up portion projecting out further toward a vehicle upper side than a vehicle upper side end portion of the elongated hole portion in a state in which the piece member is attached to the metal core; and
the guiding direction is a direction which is inclined toward the vehicle lower side, with respect to the side, in the vehicle front-rear direction, where the through hole turn-up portion is formed at the elongated hole portion of the through hole.

5. The anchor for a seatbelt device of claim 2, wherein:
the through hole includes
an elongated hole portion with a longitudinal direction thereof being in a vehicle front-rear direction, and
a through hole turn-up portion that extends from one end portion in the vehicle front-rear direction of the elongated hole portion toward a vehicle upper side;
the guide groove is opened at one side in a vehicle upper-lower direction;
the positioning portion is configured at another side of the guide groove in the vehicle upper-lower direction;
the guide portion is configured at a side of the guide groove, in the vehicle front-rear direction, where the through hole turn-up portion is formed at the elongated hole portion of the through hole; and
the guide portion has an inclined face extending toward the one side in the vehicle upper-lower direction, and the side, in the vehicle front-rear direction, where the through hole turn-up portion is formed at the elongated hole portion of the through hole.

6. The anchor for a seatbelt device of claim 1, wherein:
the guide mechanism includes: a guide projection that is formed at one of the metal core or the piece member; and a guide groove that is formed at another of the metal core or the piece member, the piece member being guided to the attachment position by the piece member being moved with respect to the metal core in a state in which the guide groove abuts the guide projection, and
the guide groove is opened at the vehicle lower side, and includes a positioning portion to which the guide projection is guided to be positioned, and a guide portion by which the guide projection is guided;
the positioning portion is configured at the vehicle upper side of the guide groove;
the guide portion is configured at the side of the guide groove, in the vehicle front-rear direction, where the through hole turn-up portion is formed at the elongated hole portion of the through hole; and
the guide portion has an inclined face extending toward the vehicle lower side in vehicle upper-lower direction, and the side, in the vehicle front-rear direction, where the through hole turn-up portion is formed at the elongated hole portion of the through hole.

7. The anchor for the seatbelt device of claim 2, wherein:
the through hole includes
an elongated hole portion with a longitudinal direction thereof being in a vehicle front-rear direction, and
a through hole turn-up portion that extends from one end portion in the vehicle front-rear direction of the elongated hole portion toward a vehicle upper side;
the piece member includes a piece member turn-up portion that is disposed inside the through hole turn-up portion of the through hole, a vehicle upper side end portion of the piece member turn-up portion projecting out further toward a vehicle upper side than a vehicle upper side end portion of the elongated hole portion in a state in which the piece member is attached to the metal core; and
the guiding direction is a direction which is inclined toward the vehicle lower side, with respect to the side, in the vehicle front-rear direction, where the through hole turn-up portion is formed at the elongated hole portion of the through hole.

* * * * *